US012810024B2

(12) United States Patent
Caravetta et al.

(10) Patent No.: US 12,810,024 B2
(45) Date of Patent: Nov. 24, 2026

(54) GENERATIVE ARTIFICIAL INTELLIGENCE/LARGE LANGUAGE MODEL APPLICATION FOR INDIVIDUALS TO PROTECT PERSONALLY IDENTIFIABLE INFORMATION/NONPUBLIC PRIVATE INFORMATION FOR ALL MONETARY AND INFORMATIONAL TRANSACTIONS [THE PITCHER]

(71) Applicants: Carlo Caravetta, Grand Saline, TX (US); Michael Korniczky, Las Vegas, NV (US)

(72) Inventors: Carlo Caravetta, Grand Saline, TX (US); Michael Korniczky, Las Vegas, NV (US)

( * ) Notice: Subject to any disclaimer, the term of this patent is extended or adjusted under 35 U.S.C. 154(b) by 100 days.

(21) Appl. No.: 18/894,664

(22) Filed: Sep. 24, 2024

(65) Prior Publication Data

US 2026/0093844 A1 Apr. 2, 2026

Related U.S. Application Data

(60) Provisional application No. 63/540,447, filed on Sep. 26, 2023.

(51) Int. Cl.

| | |
|---|---|
| ***G06F 21/62*** | (2013.01) |
| ***H04L 9/00*** | (2022.01) |
| ***H04L 9/32*** | (2006.01) |
| ***H04L 9/40*** | (2022.01) |
| ***H04W 12/02*** | (2009.01) |
| *H04L 9/08* | (2006.01) |

(52) U.S. Cl.
CPC ........ *G06F 21/6245* (2013.01); *H04W 12/02* (2013.01); *G06F 2221/034* (2013.01); *H04L 9/00* (2013.01); *H04L 9/0877* (2013.01); *H04L 9/0897* (2013.01); *H04L 9/3234* (2013.01); *H04L 63/0407* (2013.01)

(58) Field of Classification Search
CPC .......... G06F 21/6245; G06F 2221/034; H04W 12/02; H04L 9/00; H04L 9/0877; H04L 9/0897; H04L 9/3234; H04L 63/0407
USPC .............................................................. 726/26
See application file for complete search history.

(56) References Cited

U.S. PATENT DOCUMENTS

| | | | | |
|---|---|---|---|---|
| 7,543,738 | B1 * | 6/2009 | Saunders | G06Q 20/00 235/382 |
| 8,447,983 | B1 * | 5/2013 | Beck | H04L 9/0894 713/172 |
| 10,123,063 | B1 * | 11/2018 | Brown | H04N 21/6582 |
| 11,281,752 | B2 * | 3/2022 | Apsingekar | G06F 21/604 |

(Continued)

*Primary Examiner* — Thanh T Le
(74) *Attorney, Agent, or Firm* — Armstrong Teasdale LLP

(57) ABSTRACT

The key feature of the disclosure is its ability to provide selective control of PII dissemination. The individual can choose to share their PII with a third party, such as a company, for a specific purpose (e.g., applying for a loan or making a purchase). Once the transaction is complete, the App retrieves and removes all traces of the PII from the third party's system, leaving only a unique identifier—a Generative Artificial Intelligence Number (GAIN™)—similar to a Social Security Number. This GAIN™ allows the company to maintain a record of the individual without retaining their PII, thus significantly reducing the company's exposure to regulatory and legal risks.

17 Claims, 2 Drawing Sheets

(56) References Cited

U.S. PATENT DOCUMENTS

| | | | | |
|---|---|---|---|---|
| 11,574,307 | B2 * | 2/2023 | Hukmani | G06Q 20/40975 |
| 11,614,952 | B2 * | 3/2023 | Goldberg | G06F 9/451 713/168 |
| 12,333,533 | B1 * | 6/2025 | Osterkamp | G06Q 20/3821 |
| 12,481,854 | B1 * | 11/2025 | Stapleton | G06K 19/06018 |
| 2002/0004784 | A1 * | 1/2002 | Forbes | G06Q 30/06 705/51 |
| 2010/0212003 | A1 * | 8/2010 | Barillaud | H04L 63/102 726/8 |
| 2012/0158482 | A1 * | 6/2012 | Paradise | G06Q 30/0623 705/26.61 |
| 2013/0061290 | A1 * | 3/2013 | Mendel | G06Q 20/405 726/4 |
| 2013/0097417 | A1 * | 4/2013 | Lauter | H04L 9/008 713/150 |
| 2014/0298027 | A1 * | 10/2014 | Roberts | G06Q 20/20 713/171 |
| 2015/0302398 | A1 * | 10/2015 | Desai | G06Q 20/322 705/41 |
| 2016/0019536 | A1 * | 1/2016 | Ortiz | G06Q 20/382 705/67 |
| 2016/0098698 | A1 * | 4/2016 | Gopalakrishna | G06Q 20/322 705/71 |
| 2017/0070484 | A1 * | 3/2017 | Kruse | G06Q 20/401 |
| 2018/0255077 | A1 * | 9/2018 | Paine | H04L 63/1416 |
| 2019/0258820 | A1 * | 8/2019 | Gaspar | H04L 9/3239 |
| 2020/0233975 | A1 * | 7/2020 | Rosenthol | G06Q 20/385 |
| 2022/0044240 | A1 * | 2/2022 | Hukmani | B82Y 10/00 |
| 2022/0114581 | A1 * | 4/2022 | Upadhye | G06F 21/606 |
| 2022/0277102 | A1 * | 9/2022 | Kim | H04L 9/0643 |
| 2023/0246838 | A1 * | 8/2023 | Apsingekar | H04L 63/10 713/159 |
| 2023/0254152 | A1 * | 8/2023 | Ratnakaram | G06Q 20/30 726/7 |
| 2023/0334495 | A1 * | 10/2023 | Robertson | G06F 21/32 |
| 2023/0409752 | A1 * | 12/2023 | Robertson | G06F 21/32 |
| 2024/0005409 | A1 * | 1/2024 | Doney | G06Q 20/3678 |
| 2024/0020697 | A1 * | 1/2024 | Albero | G06F 21/31 |
| 2025/0063055 | A1 * | 2/2025 | Toohey | H04L 63/08 |
| 2025/0111367 | A1 * | 4/2025 | Kopf | H04L 9/3239 |
| 2025/0348441 | A1 * | 11/2025 | Leahy | G06F 13/122 |

* cited by examiner

GENERATIVE ARTIFICIAL INTELLIGENCE/LARGE LANGUAGE MODEL APPLICATION FOR INDIVIDUALS TO PROTECT PERSONALLY IDENTIFIABLE INFORMATION/NONPUBLIC PRIVATE INFORMATION FOR ALL MONETARY AND INFORMATIONAL TRANSACTIONS [THE PITCHER]

CROSS REFERENCE TO RELATED APPLICATIONS

This application is related to and claims the benefit of priority to U.S. Provisional Ser. No. 63/540,447 filed Sep. 26, 2023, which is incorporated herein by reference in its entirety.

BACKGROUND

In today's data-driven environment, particularly in commerce, medical, insurance, and information-gathering sectors, companies are responsible for controlling and maintaining Personally Identifiable Information (PII) and Nonpublic Personal Information (NPI) of individuals. This sensitive information is often subject to strict federal and state regulations, creating a substantial burden on businesses to manage large quantities of PII. These companies store vast amounts of PII in massive databases or servers, a practice necessary for regulatory compliance but fraught with risk.

Breaches of PII have escalated in frequency and scope. Since Q2 2023, such breaches have surged by 1079%, exposing millions of individuals to identity theft, fraud, and other criminal activities. Cybercriminals target these companies because the value of a single breach can provide access to vast amounts of PII, making large organizations prime targets. The financial repercussions for companies subjected to data breaches are significant, including legal liabilities, litigation costs, judgments, fines, and penalties. In many cases, penalties for failing to protect PII can reach multi-million or even multi-billion-dollar levels, threatening the survival of companies that experience even a single breach.

One widely used approach to address the PII security issue is through enhanced governmental regulations, which continue to impose stricter requirements on businesses. These regulations place the onus on companies to protect any PII they hold. Companies that misuse or fail to adequately protect PII are subject to legal liability. However, despite these regulations, breaches and misuse of PII persist.

The current system suffers from a fundamental flaw: once an individual is required to provide their PII to a third-party, they effectively lose control over how that information is used. Companies may intentionally or unintentionally misuse or share the PII, and the individual has little recourse to prevent such misuse. This lack of control over one's personal information represents a significant and growing concern for consumers, especially in an era where data privacy is increasingly valued.

BRIEF DESCRIPTION

To address these challenges, the present invention provides a novel system and method—referred to as The Pitcher™ (Pitcher is a trademark of Carlo Caravetta, Grand Saline, Texas)—designed to place control of PII back in the hands of the individual. The invention allows a user to manage their PII via an application ("App") installed on any electronic device, such as a cell phone, laptop, or desktop. The App connects to and communicates with any server over a network, allowing individuals to share and retract their PII as they see fit.

The key feature of the App is its ability to provide selective control of PII dissemination. The individual can choose to share their PII with a third party, such as a company, for a specific purpose (e.g., applying for a loan or making a purchase). Once the transaction is complete, the App retrieves and removes all traces of the PII from the third party's system, leaving only a unique identifier—a Generative Artificial Intelligence Number (GAIN™) (GAIN is a trademark of Carlo Caravetta, Grand Saline, Texas) (Gain—similar to a Social Security Number). This GAIN™ allows the company to maintain a record of the individual without retaining their PII, thus significantly reducing the company's exposure to regulatory and legal risks.

If the company requires ongoing access to the individual's payment information, such as for recurring payments, the App allows such requests to be processed through an Application Programming Interface (API). This API operates on a high-speed computing platform (e.g., quantum computing) and communicates with the GAIN™. All transactions are handled without storing the individual's PII, further mitigating the risk of breaches and misuse of sensitive data.

Additionally, the App incorporates a data-tagging program to prevent companies from using the user's PII for training their internal artificial intelligence or large language models (LLMs). The App's system ensures that, once the transaction is complete, the company retains only the GAIN™ identifier, and the user's PII is completely removed.

The invention provides a powerful solution for individuals concerned about data privacy. It significantly reduces companies' ability to track, monitor, manipulate, or sell individuals' data. The App can also erase IP addresses and browsing histories, thereby protecting the user's online presence. Ultimately, this system may alleviate the high compliance costs and legal risks companies face in relation to storing and processing PII.

DETAILED DESCRIPTION OF THE INVENTION

Figure 1:
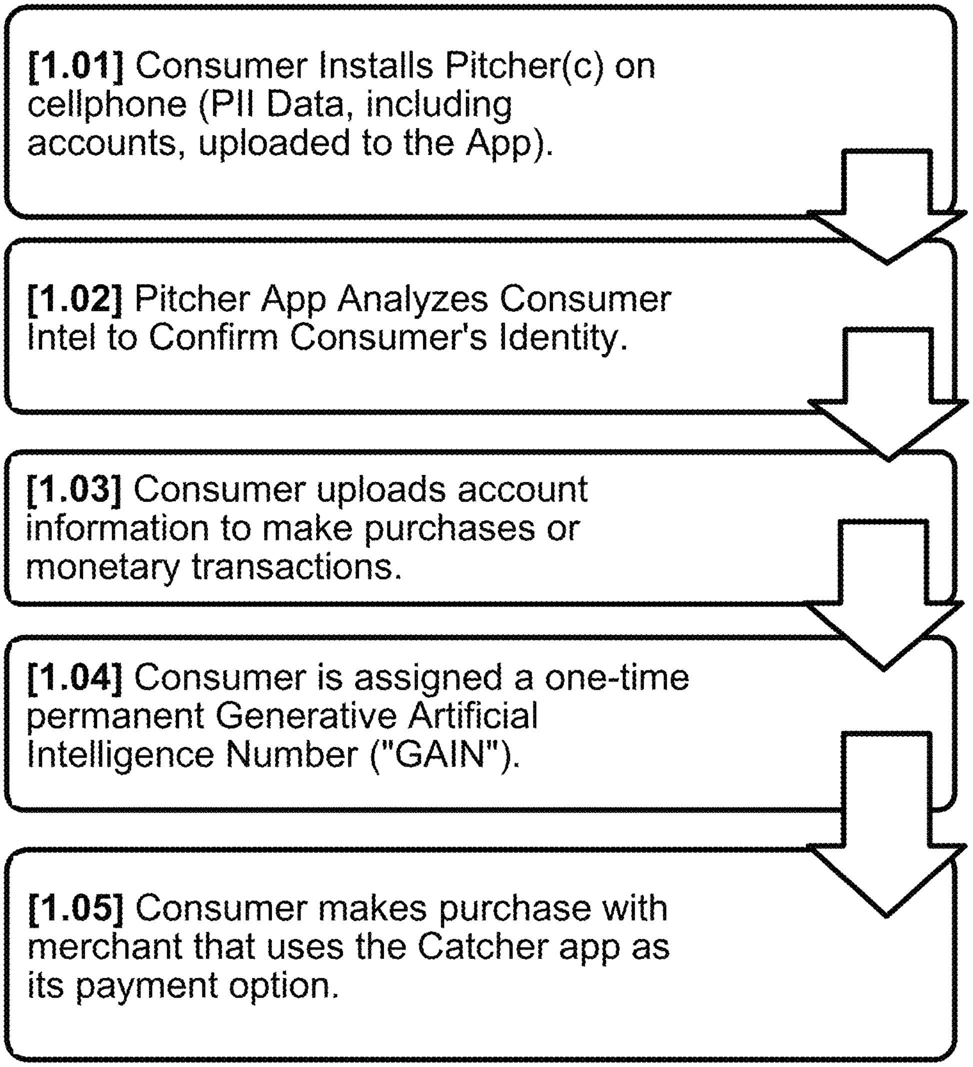
FIG. 1 illustrates the process flow of a consumer accepting and using the Pitcher™ App for managing their Personally Identifiable Information (PII) during transactions.

FIG. 1 illustrates the process flow of a consumer accepting and using the Pitcher™ App for managing their Personally Identifiable Information (PII) during transactions. The steps are as follows:

Consumer Installs Pitcher™ App: The consumer downloads and installs the Pitcher™ App on their smartphone or other electronic devices from the provider's website. The app serves as the primary interface for the user to manage their PII and control how it is shared with third parties.

PII Data Upload: Upon installation, the consumer uploads their PII into the app, including account details required for making purchases or other transactions. This data is stored locally on the consumer's phone, ensuring that no PII is transferred or stored on external servers during this phase.

Identity Confirmation via Consumer Intel: The Pitcher™ App performs an analysis of the consumer's device and behavioral data (e.g., purchase history, usage patterns, and other consumer-provided information) to verify the consumer's identity. This analysis is carried out with the user's consent, ensuring a secure and authenticated transaction process.

Assignment of Generative Artificial Intelligence Number (GAIN™): Once the identity is confirmed, the consumer is assigned a unique, permanent Generative Artificial Intelligence Number (GAIN™), which acts as a proxy for their PII. The GAIN™ enables the consumer to engage in transactions without directly exposing their sensitive information.

Account Selection for Transactions: The consumer selects which accounts they wish to use for specific transactions. The app stores this information in segregated sections on the consumer's device. No PII is transmitted externally, maintaining the consumer's control over their personal data.

Transaction with Merchant (Catcher™ Integration) (Catcher is a trademark of Carlo Caravetta, Grand Saline, Texas): The consumer engages in a monetary or informational transaction with a merchant that supports the Catcher™ App. The Pitcher™ App links with the Catcher™ App to facilitate the transaction, using the GAIN™ as the reference number instead of PII. This ensures that the merchant can process the transaction without retaining the consumer's PII.

Completion of Transaction and Retention of GAIN™: Once the transaction is complete, the merchant retains only the GAIN™ as a record of the transaction. No PII remains within the merchant's system, significantly reducing the risk of breaches or misuse of the consumer's personal data.

Figure 2:
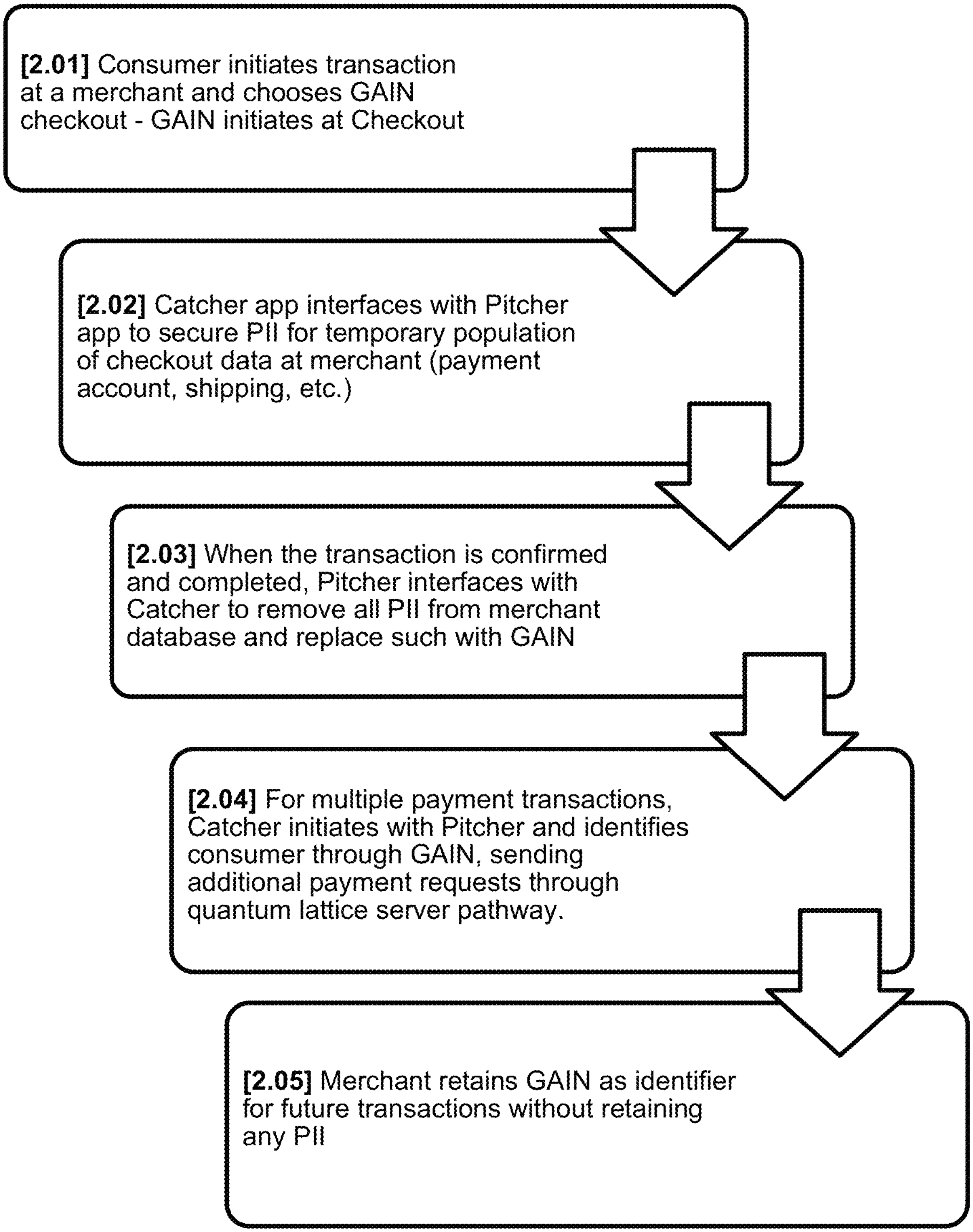
FIG. 2 illustrates the processes and interactions within a quantum computing lattice platform that occur when a consumer uses their Generative Artificial Intelligence Number (GAIN™) for purchases, loans, or recurring payments, without the need for Personally Identifiable Information (PII) to be shared or stored.

FIG. 2 illustrates the processes and interactions within a quantum computing lattice platform that occur when a consumer uses their Generative Artificial Intelligence Number (GAIN™) for purchases, loans, or recurring payments, without the need for Personally Identifiable Information (PII) to be shared or stored.

Pathway Through Quantum Computing Lattice Platform Established (No PII): Once the consumer is assigned a GAIN™, it becomes their permanent identifier within the system. This GAIN™ provides a secure and anonymous pathway through a quantum computing lattice platform, allowing the consumer to make purchases, apply for loans, or complete payment plans without sharing PII.

Customer Initiates Purchase at Merchant Platform: The consumer initiates a transaction at a merchant, platform, or waterfall (e.g., a marketplace or financial institution). At checkout, the consumer chooses to use their GAIN™ as the identifier, instead of providing their PII. The GAIN™ is activated during the checkout process, creating a secure, anonymous transaction.

Catcher™ Interfaces with Pitcher™ to Secure Temporary PII for Checkout: The Catcher™ App (used by the merchant) interfaces with the consumer's Pitcher™ App to temporarily access the required PII, such as payment details and shipping information, from the consumer's device. This PII is used solely for processing the current transaction.

Confirmation and Completion of Transaction: Once the transaction is confirmed and completed, the Pitcher™ App interacts with the Catcher™ App to remove all PII from the merchant's system. The PII is replaced with the consumer's GAIN™, which the merchant retains as a future identifier for the consumer. This process ensures that the consumer's PII is not stored by the merchant or exposed to potential breaches.

Multiple Payment Transactions and Loan Repayments: For transactions requiring multiple payments or loans, the Catcher™ App identifies the consumer using their GAIN™ and initiates additional payment requests through the quantum lattice platform. The GAIN™ serves as the permanent identifier, allowing for secure payments without the need for PII.

Pitcher™ and Catcher™ API Integration: The Pitcher™ App uploads the consumer's data for transaction approval through an API, establishing a direct pathway between the merchant or platform and the consumer's accounts. This allows the merchant to access the necessary data to make a credit determination, such as term payments or loans, and populate the required transaction details, including shipping.

Approval or Denial of Transaction/Loan: The transaction or loan is either approved or declined by the merchant/platform/waterfall. If declined, the Pitcher™ App ensures that all PII is removed from the merchant's system without leaving a GAIN™ record. If approved, the Pitcher™ App replaces the PII with the GAIN™ for future use.

Merchant Sends Payment Requests Through Catcher™ App for Recurring Transactions: For recurring payments or loans, the merchant/platform/waterfall sends payment requests through the Catcher™ App using the GAIN™. The quantum computing lattice platform ensures secure, anonymous payments, with no PII involved. The merchant's system continues to operate as normal, but instead of using PII to identify the consumer, the GAIN™ is used as the identifier, preserving the consumer's privacy.

Dynamic Interface Between Pitcher™ and Catcher™: The interface between the Pitcher™ and Catcher™ Apps can be optimized using machine learning techniques based on transaction history and patterns. This dynamic interface adjusts the layout and interaction process to streamline transactions for each specific merchant or platform, while continuing to use the GAIN™ and ensuring no PII is exposed.

Anonymous Data Collection for Marketing and Analytics: Merchants and platforms are able to collect marketing and purchasing data without using PII. The GAIN™ allows companies to track generic consumer behavior for data analysis and marketing purposes, while protecting the consumer's identity. This system can be applied to fields such as healthcare and insurance, enabling HIPAA-compliant data collection without the risk of exposing sensitive PII.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S. C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for managing Personally Identifiable Information (PII) during transactions, comprising:

- a first application ("first App") installed on a user's device;
- a local database within the first App to store the user's PII, segregated from external servers;
- a processor programmed to:
  - verify the user's identity by analyzing consumer behavior and device data; and
  - assign a Generative Artificial Intelligence Number to the user upon identity verification, the Generative Artificial Intelligence Number being used as a proxy for the user's PII in transactions;

receive a selection of a user account to use in transactions; and transmit transaction information to an external merchant systems during a transaction, wherein for the transaction information the Generative Artificial Intelligence Number is transmitted instead of the user's PII.

2. The system of claim 1, wherein the processor is further programmed to be in communication with a merchant system using a second App for facilitating secure transactions.

3. The system of claim 1, wherein the processor is further programmed to perform identity confirmation by analyzing device histories, browsing activities, and user-consented behavioral data.

4. The system of claim 1, wherein the first App allows the user to control the level of privacy protection by selecting which accounts and information are shared with external parties.

5. The system of claim 1, wherein the Generative Artificial Intelligence Number is utilized in a quantum computing platform for secure, high-speed data processing without storing the user's PII.

6. A method for protecting Personally Identifiable Information (PII) during monetary or informational transactions, comprising:

installing first application ("first App") on a user's device, the first App configured to store PII locally;

analyzing device and behavioral data to verify the user's identity;

assigning a Generative Artificial Intelligence Number to the user after identity verification; and using the Generative Artificial Intelligence Number in place of PII for transactions with third parties.

7. The method of claim 6, wherein the third-party system is equipped with a second App for processing transactions using the Generative Artificial Intelligence Number.

8. A system for conducting transactions without the use of Personally Identifiable Information (PII), comprising:

a quantum computing lattice platform including a hardware processor and a memory, wherein the quantum computing lattice platform is programmed to process transactions using a Generative Artificial Intelligence Number as a consumer identifier;

a first application ("first App") installed on a consumer's device, storing PII locally and allowing the consumer to select the Generative Artificial Intelligence Number for transactions;

a second application ("second App") used by a merchant platform, interfacing with the first App to temporarily access PII for transaction completion, and subsequently replacing PII with the Generative Artificial Intelligence Number; and a communication pathway established between the first App and the second App for secure, anonymous transactions through the quantum computing lattice platform.

9. The system of claim 8, wherein the quantum computing lattice platform is further programmed to process a plurality of payment transactions and loan repayments using the Generative Artificial Intelligence Number without storing PII.

10. The system of claim 8, wherein the second App temporarily accesses payment and shipping information from the consumer's device and replaces this PII with the Generative Artificial Intelligence Number after transaction completion.

11. The system of claim 8, further comprising an API for facilitating the exchange of data between the first App and the merchant platform to complete credit determinations, shipping, and other transactional requirements.

12. The system of claim 8, wherein the first App removes all PII from the merchant's system following transaction approval, replacing it with the Generative Artificial Intelligence Number for future use.

13. The system of claim 8, wherein the merchant sends payment requests through the quantum computing lattice platform using the Generative Artificial Intelligence Number for recurring transactions without the need for PII.

14. A method for conducting secure transactions without sharing Personally Identifiable Information (PII), comprising:

establishing a quantum computing lattice platform to process transactions using a Generative Artificial Intelligence Number;

using a first application ("first App") to store PII on a consumer's device and facilitate transactions using the Generative Artificial Intelligence Number;

interfacing with a merchant system through a second application ("second App") to temporarily access consumer PII for transaction completion, then replacing PII with the Generative Artificial Intelligence Number; and processing payment requests for multiple payment transactions and loan repayments using the Generative Artificial Intelligence Number through the quantum computing lattice platform.

15. The method of claim 14, further comprising dynamically adjusting an interface between the first App and the second App based on user behavior and historical transaction data using machine learning techniques.

16. The method of claim 14, wherein the merchant collects anonymous data for marketing and transactional analysis using the Generative Artificial Intelligence Number, without exposing consumer PII.

17. The method of claim 14, wherein the system can be applied in healthcare or insurance fields to collect HIPAA-compliant data on service usage without storing or transmitting PII.

* * * * *